United States Patent Office 2,977,198
Patented Mar. 28, 1961

2,977,198

METHOD OF PRODUCING HIGH PURITY SILICON TETRACHLORIDE

Martin Benedict MacInnis, Towanda, Pa., assignor, by mesne assignments, to Sylvania Electric Products Inc., Wilmington, Del., a corporation of Delaware No Drawing. Filed Sept. 25, 1956, Ser. No. 612,050

5 Claims. (Cl. 23—205)

This invention relates to a method of purifying silicon tetrachloride and more particularly to a method of producing spectrographically pure silicon tetrachloride by treatment of lower purity silicon tetrachloride with fuming sulphuric acid.

Commercially available silicon tetrachloride normally is contaminated with varying amounts of impurities including for example, aluminum, boron, arsenic, copper, iron, chromium, magnesium, phosphorus, titanium, vanadium, nickel and zirconium. These impurities represented by the above metals are derived not only from the intermediates employed in the production of the silicon tetrachloride, but also from the apparatus in which the compound is manufactured and the containers in which it may be shipped or stored. In the following description of my invention and in the appended claims it is to be understood that the term "impure silicon tetrachloride" refers to silicon tetrachloride containing spectrographically detectable amounts of any of the above-mentioned elements.

Although for many uses of silicon tetrachloride the nature and amount of impurities present may not be objectionable, it has been realized for some time that the presence of even minute amounts of such impurities is highly undesirable where the silicon tetrachloride is employed as the source of silicon for semiconductor devices such as transistors and diodes. Actually very small amounts of certain of the impurity elements mentioned above may be deliberately incorporated in the silicon used in semiconductor devices to obtain particular characteristics, but the amount of such additions must be precisely controlled. For this reason it is necessary to start with extremely pure silicon rather than to rely on the chance quantities of impurity which might be present in silicon produced from normally available commercial grades of silicon tetrachloride. Various methods for producing elemental silicon from silicon tetrachloride are known and used. One commonly employed method involves the reaction of zinc with silicon tetrachloride to reduce the compound to the elemental silicon.

Although substantial advances have been made in methods for purifying silicon in its elemental state, it has been recognized that further improvements in the quality of silicon for semiconductor devices could be achieved by more effective purification of the intermediate silicon tetrachloride. Thus efforts have been made to produce silicon tetrachloride of the desired ultra purity by fractional distillation of the compound. Although this technique has met with some success, it involves the use of elaborate equipment and lacks the flexibility necessary to cope with the variations in the nature and quantities of impurities between batches of the commercially available compound. Attempts also have been made to extract the impurities from silicon tetrachloride with aqueous acid solutions such as hydrochloric and sulphuric acids of concentrated or lower strengths.

Although it has been possible to purify germanium tetrachloride, a compound similar in many respects to silicon tetrachloride, by the above-mentioned extraction procedures, attempts to duplicate these results with silicon tetrachloride have met with failure because of the hydrolysis of the silicon tetrachloride which is unavoidable under the conditions normally required for extraction. When the aforementioned aqueous solutions are mixed with silicon tetrachloride a violent reaction takes place resulting in the formation of silica gel. The presence of the insoluble silica gel not only represents a substantial loss of the silicon tetrachloride but prevents proper separation of the extracted silicon tetrachloride phase from the aqueous phase containing the impurities.

It is, therefore, an object of this invention to provide an improved method for purifying silicon tetrachloride.

A further object is to provide a method of treating impure silicon tetrachloride to reduce the impurity content thereof below the value at which such impurities are spectrographically detectable.

A still further object of the invention is to provide an extraction method of purifying silicon tetrachloride which is readily and economically accomplished and which affords high yields of purified silicon tetrachloride.

Briefly stated, the method by which I attain the above objects involves intimately contacting impure silicon tetrachloride with concentrated sulphuric acid containing at least sufficient excess sulphur trioxide, $SO_3$, so that the acid is of a minimum concentration of 100% equivalent $H_2SO_4$. The intimate contact can be achieved in any suitable manner as, for example, by passing the silicon tetrachloride and acid countercurrently or concurrently through a packed column or by simply agitating a mixture of the two materials in a suitable acid-proof vessel. Only a brief period of contact is required for the acid to extract the impurities from the silicon tetrachloride and at the end of this period the acid layer is separated from the silicon tetrachloride. The silicon tetrachloride so treated is ready for reduction to elemental silicon of the desired high degree of purity or for any other use where it is particularly desirable to have a starting material of high purity.

The material normally referred to in the art as "concentrated" sulphuric acid actually comprises about 96% equivalent $H_2SO_4$, the balance being water which can be considered as uncombined with $SO_3$. Otherwise stated, concentrated or 96% sulphuric acid contains about 78.4% total $SO_3$. I have found that acid solutions suitable for use in the method of my invention must contain at least about 81.6% total $SO_3$. That is, the solution must be of a minimum concentration of substantially 100% equivalent $H_2SO_4$, in contrast to the familiar concentrated (96% equivalent $H_2SO_4$) sulphuric acid. Solutions containing larger excesses of $SO_3$ as, for example, 93.5% total $SO_3$, may be used, but no particular advantage is realized by employing acid containing total $SO_3$ in amounts greater than the last mentioned concentration. I have found sulphuric acid containing about 84.4% total $SO_3$ is particularly suitable in the process of my invention.

In order that those skilled in the art better may understand how the present invention may be practiced, the following examples are given by way of illustration.

*Example 1*

One hundred and fifty (150) milliliters of silicon tetrachloride containing impurities in the amount shown in Table I was placed in a 500 milliliter separatory funnel. Fifty (50) milliliters of fuming sulphuric acid containing 20% excess $SO_3$ over that necessary for 100% equivalent $H_2SO_4$ (about 85.3% total $SO_3$) were added and the funnel was shaken for about 5 minutes to thoroughly mix the acid and the silicon tetrachloride. No heat was supplied, so that the resulting extraction of the impurities was accomplished at about room temperature (about 70° F.). The contents of the funnel were then allowed to settle and separate into two phases. The interface between the lower sulphuric acid layer and the upper silicon tetrachloride layer was sharp and distinct and there was no evidence of formation of silicon dioxide. About 1 minute was allowed for complete separation of the phases and then a sample of the silicon tetrachloride layer was taken for spectrographic analysis. The steps of adding sulphuric acid to the silicon tetrachloride in the separatory funnel, agitating, separating the phases into layers and sampling of the extracted tetrachloride were repeated twice more in identical fashion and with the same quantity and concentration of sulphuric acid. The concentration of impurities in the silicon tetrachloride after each extraction stage are set forth in Table I.

The spectrographic analysis was actually made on silica produced from the silicon tetrachloride. This was done by adding the silicon tetrachloride slowly to doubly deionized water with constant agitation and while maintaining the temperature of the water as near as possible to 0° C. in an ice-water bath. The resulting gel was placed on a steam bath until most of the hydrochloric acid fumes were driven off. The gel was then dried thoroughly and spectrographically analyzed using a Bausch and Lomb Littrow Quartz Spectrograph.

TABLE I

| Impurity Elements in p.p.m.[1] | Initial SiCl$_4$ | SiCl$_4$, First Extraction | SiCl$_4$, Second Extraction | SiCl$_4$, Third Extraction |
|---|---|---|---|---|
| Al | 50 | | | |
| B | 500 | | | |
| Cu | 1 | | 1 | |
| Mg | 1 | 1 | 1 | |
| Ti | 3,000 | | | |
| V | 80 | 30 | | |
| | 3,632 | 31 | 2 | 0 |

[1] Parts per million by weight.

It is to be noted that the impurities present in the original silicon tetrachloride were greatly reduced in concentration by the first extraction and that barely detectable amounts remained after the second extraction. After the third extraction no impurities were present in sufficient quantity to be detected spectrographically.

Although the acid and the silicon tetrachloride were maintained in intimate contact for about 5 minutes in Example 1, this is not critical. Longer or shorter periods of time may be employed in a batch operation depending on the effectiveness of the agitation. Similarly the time allowed for the layers to separate is of no particular significance in the method.

*Example 2*

Fifteen (15) milliliter portions of silicon tetrachloride to each of which a known amount of radioactive impurity had been added were placed in 30 milliliter glass-stoppered weighing burettes. Fifteen milliliter portions of fuming sulphuric acid containing 15% excess SO$_3$ over that necessary for 100% equivalent H$_2$SO$_4$ (about 84.4% total SO$_3$) were added and the burettes were shaken for about 5 minutes. About 1 minute was allowed for the contents of the burettes to settle and separate into a lower acid layer and an upper extracted silicon tetrachloride layer. The separation of the layers was rapid and the line of demarcation between the purified silicon tetrachloride and the sulphuric acid was sharp and clean. There was no indication of the presence of silica gel in either layer. A sample of the silicon tetrachloride layer was taken from each burette and the content of the impurity was determined by radioactive measurement. The results of these tests are show in Table II.

TABLE II

| Impurity | Concentration of Impurity in Silicon Tetrachloride (parts per million by weight) | |
|---|---|---|
| | Initial | Final |
| Cu | 2.8 | $5.7 \times 10^{-4}$ |
| As (trivalent) | 1.2 | $2.3 \times 10^{-3}$ |
| P (trivalent) | 0.28 | $1.5 \times 10^{-3}$ |
| P (pentavalent) | 0.46 | $1.0 \times 10^{-4}$ |

In Example 2, the concentrations of impurities in the original silicon tetrachloride were much lower than the concentrations of impurities in Example 1. For this reason the technique of determining the concentration of impurity after extraction by measurement of the radioactivity of the purified silicon tetrachloride was followed. The quantities of impurities in the purified material were reduced below the point where they were detectable spectrographically. It is to be noted that the present method is extremely effective even at very low levels of impurity concentration.

*Example 3*

One hundred and fifty (150) milliliters of silicon tetrachloride containing 20,000 parts per million by weight of titanium were placed in a separatory funnel. About 50 milliliters of fumming sulphuric acid containing about 65% SO$_3$ in excess of the amount necessary for 100% sulphuric acid (about 93.6% total SO$_3$) were added to the impure silicon tetrachloride and the funnel was shaken for about 5 minutes to bring the acid into thorough contact with the silicon tetrachloride. On allowing the mixture to settle for about 1 minute, a clear line of separation between the acid layer and the silicon tetrachloride layer appeared. A sample of the silicon tetrachloride was converted to silica and analyzed spectrographically as described in Example 1. It was found to contain no detectable concentration of titanium.

As is evident from the preceding illustration of the method of my invention, sulphuric acid containing very large excesses of SO$_3$ can be effectively employed. However, from a practical standpoint, it is more desirable to use fuming acid containing lesser quantities of free SO$_3$. This is primarily for the reason that fuming acids of higher SO$_3$ content which are commercially available tend to contain, in themselves, undesirable quantities of impurities. Furthermore, it is desirable to avoid the necessity for tightly sealed or pressure vessels which might be required to prevent escape of the SO$_3$ from the system employed.

What I claim as new and desire to secure by Letters Patent of the United States is:

1. The method of purifying impure silicon tetrachloride which comprises extracting said silicon tetrachloride with fuming sulphuric acid.

2. The method of reducing the impurity content of silicon tetrachloride which comprises intimately contacting said silicon tetrachloride with fuming sulphuric acid and thereafter separating the sulphuric acid from the desired purified silicon tetrachloride.

3. The method of removing impurities from impure silicon tetrachloride which comprises intimately contacting said silicon tetrachloride with a sulphuric acid solution containing at least about 81.6% total SO$_3$.

4. The method of purifying silicon tetrachloride which includes the steps of intimately contacting impure silicon tetrachloride with sulphuric acid of a minimum concentration of substantially 100% equivalent H$_2$SO$_4$ and thereafter separating said acid from the silicon tetrachloride of desired high purity.

5. The method of producing spectrographically pure silicon tetrachloride which comprises intimately mixing a sulphuric acid solution containing at least about 81.6% total $SO_3$ with silicon tetrachloride containing spectrographically detectable quantities of impurities, allowing the resulting mixture to stand until a layer of acid containing the impurities separates from the purified silicon tetrachloride and recovering said purified silicon tetrachloride.

References Cited in the file of this patent

UNITED STATES PATENTS 2,844,441     Pellin _____ July 22, 1958

OTHER REFERENCES

Mellor: "Treatise on Inorganic and Theoretical Chemistry" (1925), vol. VI, page 965.

Ehret, "Smith's College Chemistry," 6th ed., 1946, page 460.

German Printed Application, Melzer, No. C5410 IVa/12i, Mar. 1, 1956.